Dec. 2, 1947. C. W. DALZELL 2,431,992
COMPENSATORY SUPPRESSED POINTER ADJUSTMENT FOR ELECTRIC METERS
Filed Aug. 5, 1943 2 Sheets-Sheet 1
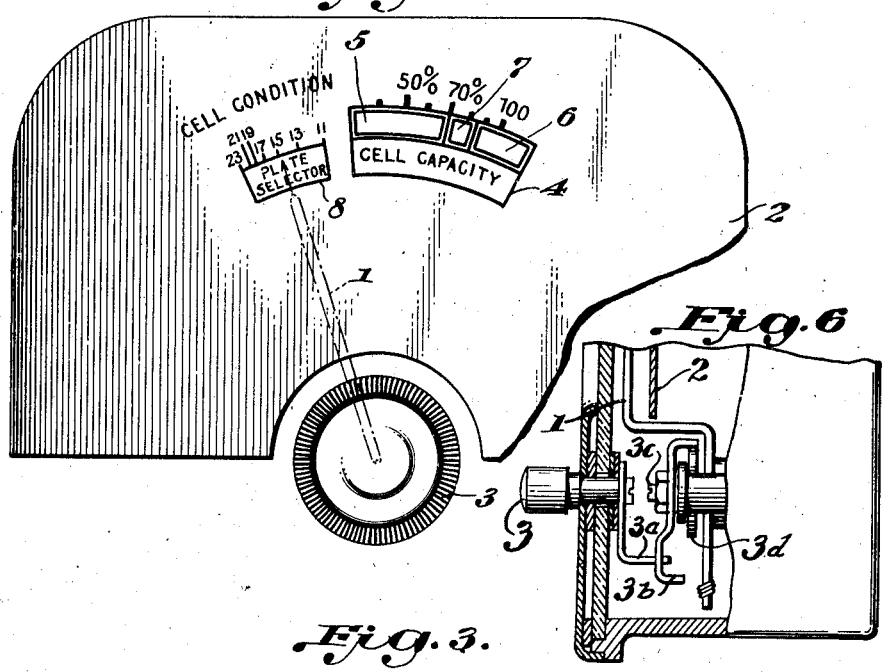
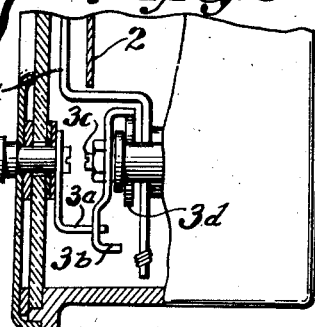
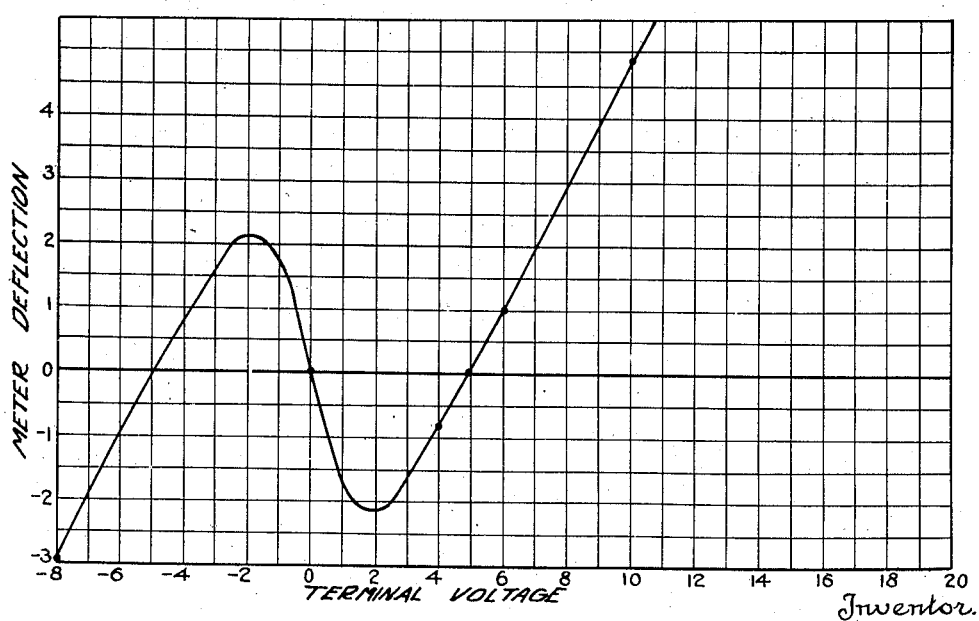
Inventor.
Clarence W. Dalzell.
By
Semmes Keegin Beale & Semmes
Attorneys Dec. 2, 1947. C. W. DALZELL 2,431,992
COMPENSATORY SUPPRESSED POINTER ADJUSTMENT FOR ELECTRIC METERS
Filed Aug. 5, 1943 2 Sheets-Sheet 2
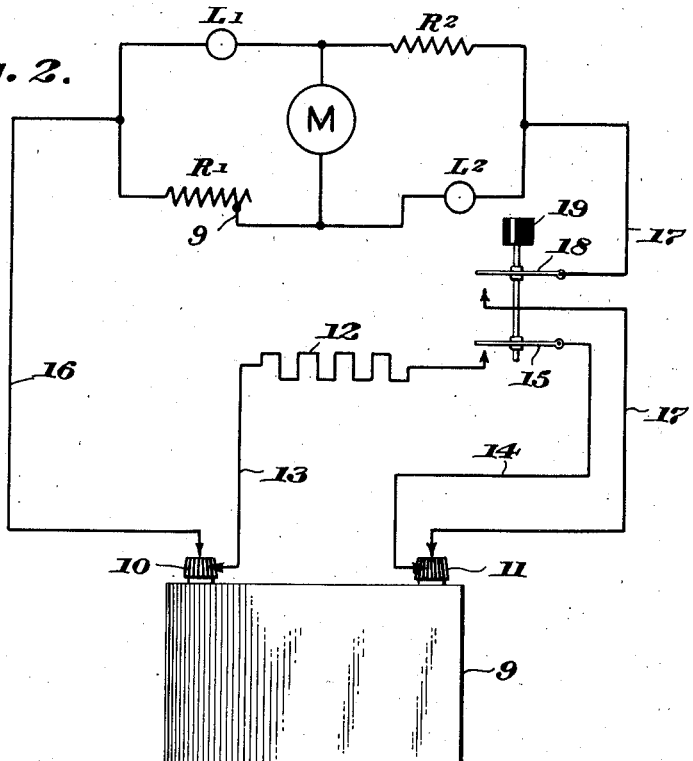
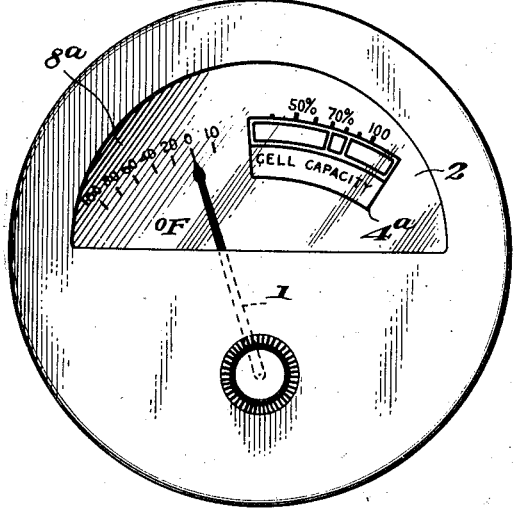
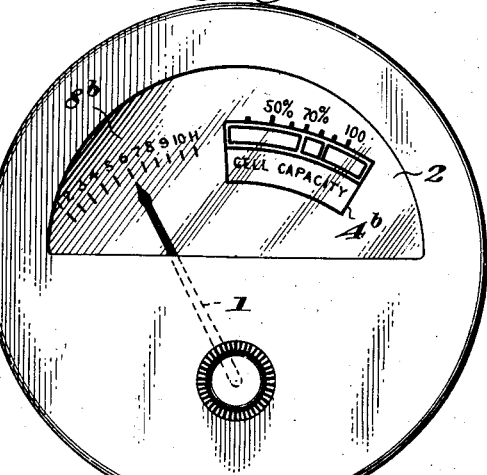
Inventor
Clarence W. Dalzell Patented Dec. 2, 1947

2,431,992

UNITED STATES PATENT OFFICE 2,431,992

COMPENSATORY SUPPRESSED POINTER ADJUSTMENT FOR ELECTRIC METERS

Clarence W. Dalzell, West Caldwell, N. J., assignor to Knickerbocker Development Corporation, Belleville, N. J., a corporation of Delaware Application August 5, 1943, Serial No. 497,483

7 Claims. (Cl. 171—95)

This invention relates to instruments and apparatus for testing units having a plurality of interdependent variable characteristics, more particularly for electrical testing of storage batteries, cables, and like devices which are commercially supplied in a range of sizes or capacities or which have interdependent variable characteristics such as voltage, current output capacity, temperature of electrolyte, dielectric resistance and others.

In the testing of electrical accumulators or storage batteries it has been proposed to measure the voltage of the battery while discharging a heavy current through a fixed low resistance, and to make allowance for the variations in the resistance offered to said current resulting from differences in the size or number of plates in different batteries by placing a rheostat in the circuit of the measuring instrument which will cut more or less resistance into said circuit according to whether the number of plates is smaller or larger, said rheostat having its contact arm movable over a scale graduated directly in plate numbers.

This arrangement is subject to several disadvantages since the rheostat is comparatively expensive and its windings are liable to have variations in resistance per unit of length that have to be taken into account in the calibration of the instrument.

One object of the invention is to provide a compensating means in a testing instrument that will eliminate any compensating rheostat.

Another object of the invention is to provide a compensating means in a testing instrument that can be readily altered to compensate for additional sizes of batteries or other devices under test, and for different variable characteristics therein.

A further object of the invention is to provide a large amplitude of pointer travel in a testing instrument for a limited critical range of the variable being tested.

A still further object of the invention is to utilize an amplitude of pointer travel in the testing instrument which is so large relatively to the observed range of the variable being tested that small changes in this variable due to other variable conditions can be readily detected and compensated.

The invention comprises the provision of a second scale on the instrument dial near the initial position of the movable pointer or indicator of the instrument which second scale is graduated for different values of a variable characteristic on which another variable characteristic to be read on the main or first scale of the instrument is dependent, and in providing a manual adjustment of the initial position of said pointer whereby it can be set to any point on the second scale.

The invention also comprises novel means for suppressing pointer movement through a range of the variable characteristic which it is not desired to measure on the first or main scale whereby the whole travel of the pointer through the said scale is made available for the range of the characteristic variation it is desired to observe or measure.

The hereinafter described embodiments of the invention relate specifically to the testing of electrical storage batteries but it is to be understood that the invention is not limited thereto and can be employed in other fields requiring the testing of a characteristic of materials and devices or units which are subject to a variation in performance dependent on said characteristic.

In the accompanying drawings:

Figure 1 illustrates diagrammatically the dial face of a testing meter embodying the invention, in front elevation.

Figure 2 is a circuit diagram showing how the meter of Figure 1 is used in testing storage batteries.

Figure 3 is a graph of the voltage-deflection characteristics of a bridge circuit shown in Figure 2.

Figure 4 is a diagrammatic front view of the dial of a modified form of testing meter.

Figure 5 is a similar view of another modified form of testing meter dial.

Figure 6 is a fragmentary vertical sectional view of a meter showing the details of the zero adjustment mechanism for the pointer.

The battery testing meter shown diagrammatically in Figure 1 has a dial 2 over which moves a pointer or indicator 1. The dial bears a scale 4 corresponding to a selected voltage range which is of interest in testing, extending say from 5–6 volts in the case of a six volt automobile battery and is marked with color zones corresponding to certain critical sub-ranges, viz. a red zone 5 indicating a sub-normal voltage requiring recharging or replacement of the battery under test, a green zone 6 indicating voltage showing a sufficiently or fully charged battery, and an intermediate yellow zone 7. At the left of the dial, near the position of rest of the pointer 1, is a scale 8 with divisions marked with the numerals 11, 13, 15, 17, 19, 21, 23, these being the number of plates in a series of commercial automobile storage batteries.

Ordinarily the pointer of a meter is provided with a zero adjustment, operative through a small arc, comprising a screw in the axis of the pointer for rotating one of the pointer control springs relative to the other and adapted to be set by a screw driver. According to the present invention the pointer 1 is adjustable manually by means of a knob 3 over the whole range of the scale 8 to enable the meter to be set for any size of battery to be tested, say from an 11 plate battery up to a 23 plate battery. Knob 3 is rotatably mounted on the meter casing and carries on its inner end a crank $3a$ which engages in a vertical slot, not shown, in the lower end of a lever $3b$ pivotally mounted on a shaft $3c$. The upper end of the lever $3b$ is connected to the outer end of a hair spring $3d$, the inner end of which is connected to the pointer 1. With this construction, the zero position or the position of rest of the pointer 1 may be adjusted by adjusting the outer position of the hair spring $3d$ through the lever $3b$, crank $3a$ and knob 3.

Storage batteries are tested for voltage under load by discharging through a fixed low resistance and measuring the voltage while so discharging. An 11 plate battery will have a lower terminal voltage under such conditions than a 13 plate battery, a 13 plate battery will have a lower terminal voltage than a 15 plate battery, and so on, because the internal resistance of the battery diminishes as the number of plates increases. The plate scale 8 and adjusting knob 3 make it possible for the measuring scale 4 to read in the same way for any size of battery by merely setting the pointer 1 initially to one of the positions, 11, 13, 15, 17, 19, 21 or 23 on the scale 8 corresponding to the size of the battery to be tested. It will be seen that position 11 on the scale 8 is nearest the measuring scale 4, position 13 next nearest, and so on.

In the testing of storage batteries, the interest is mainly limited to a voltage range in the region of 5–6 volts for a six volt battery, so that, if the whole arc of deflection of the pointer is proportional to 6 volts, the readings which it is desired to make will be confined to a mere fraction of this arc, and the divisions in the desired range will be unduly crowded. For this reason it is desirable to use an instrument with a suppressed zero and expanded scale, that is, an instrument in which a major portion or even the whole of the arc of deflection of the pointer is utilized for the reading zone or band of the scale 4, and with elimination of readings for low battery voltages under the lower limit of the red zone 5. A convenient and simple means for obtaining a suppressed zero expanded scale characteristic in a commercial linear law deflection voltmeter type of instrument is shown in Figure 2.

As indicated in Figure 2, the instrument M is a normal moving coil, permanent magnet instrument with linear deflection, that is the deflection of the pointer is a linear function of the milliamperes flowing through the coil. The instrument is connected in a bridge circuit $R_1$, $R_2$, $L_1$, $L_2$, in which $R_1$ and $R_2$ are resistances which remain constant irrespective of the current flowing through them within the range of operation of the apparatus, and $L_1$ and $L_2$ are resistances which increase with the current passing through them, for example tungsten filament lamps. Resistance $R_1$ has a tap on it which is manually set during calibration at the factory. A meter thus connected will give a deflection-voltage characteristic curve such as is shown in Figure 3. With no voltage, the meter deflection is zero. If the voltage increases from zero to five, most of the current will flow through $L_1$ and $L_2$ and the meter reads backwards. At 5 volts the resistances of $L_1$ and $L_2$ will have increased to such a value that the reading of the meter is again zero, and when the voltage increases above 5 volts the meter will read positively. The constants of the circuit are so arranged that the range 5–6 volts gives full scale deflection of the pointer, by using this second zero point corresponding to 5 volts.

Figure 2 shows the meter and bridge connected to the battery to be tested. The battery 9 has its terminals 10, 11 connected to a load resistance 12 through leads 13, 14 and a switch 15. The resistance 12 including its leads and contact resistance would constitute a resistance of .0289 ohm for a 6 volt automobile battery. The bridge circuit is connected to the battery terminals by leads 16, 17 the lead 17 having a switch 18 therein. Both switches 15 and 18 may be operable by the same push button 19 in such a manner that switch 15 is closed first, then switch 18.

The instrument M has the scale 8 for battery size and the initial pointer setting adjusting knob 3 of Figure 1 and when used in the bridge circuit shown in Figure 2, its pointer has a large range of movement in the zone of critical or interesting readings and the unimportant range below 5 volts is suppressed, whereby great sensitiveness and accurate reading in the critical range are achieved. The use of the expanded measuring scale is particularly important in conjunction with the battery size scale 8 because the divisions of the latter are somewhat closely spaced since they represent small voltage differences, and the differences in battery voltage which prevail in a battery charged between 50% and 130% of rated capacity are themselves small. Because a lead acid storage battery has such a flat load-voltage characteristic curve, it is necessary, in order to judge between a good condition 130% charged battery or a poor, say 70% charged battery, to have an expanded voltmeter scale which spreads out the differences in these voltages to such an extent that they can be readily read on a scale. The expanded scale makes it useful to place scale markings of battery sizes (numbers of plates) on the scale 4, with desirable cooperation of the pointer with both scales 4 and 5.

It will be seen that the invention achieves the following advantages:

A good plate number selection adjustment is provided in the testing instrument without the use of parts other than a knob attached to the usual zero adjustment of the instrument. Precision relationship between the plate number selector scale and the testing or measuring scale is guaranteed because both scales are on the same dial.

The initial zero adjustment for plate number eliminates the use of a rheostat which would otherwise have to be placed in either the lead 16 or the lead 17 of Figure 2, and thereby eliminates sliding contact fingers in the rather low resistance metering circuit. The current in the lead 16 would normally be about one-half ampere. Elimination of a rheostat also removes a source of possible inaccuracy due to commercial tolerances in the windings of the rheostat, and the meter scale divisions can be selected deliberately in line with the actual voltage encountered, independently of such tolerances.

Also changes in calibration to handle additional sizes of batteries can be made by merely changing the scales.

The zero setting feature of the invention is applicable in the battery testing field to variables other than the battery size or number of plates, for example temperature of electrolyte, state of charge, degree of surface charge, any of which variables by itself or in combination with others, have to be determined before the true condition or wear of the battery is fully known. Figure 4 shows the dial of the instrument as designed to compensate for electrolyte temperature instead of number of plates. The scale 8a in this instance is graduated in degrees Fahrenheit of electrolyte temperature from 100° to —10°, the 100° division being farthest from the scale 4a. The pointer is set initially to the measured electrolyte temperature of the battery to be tested, and the pointer will show readings on the scale 4a having the same meanings for batteries of different electrolyte temperature.

In Figure 5, the scale 8b is provided with arbitrary graduations numbered 1–11 to which various desired variables can be assigned by means of tabulations or the equivalent, enabling the meter to be compensated for a selected variable condition.

The invention can be utilized in fields other than that of battery testing, and generally in any testing device for gauging the quality of materials or devices or units which are subject to a variation in performance or have a plurality of interdependent variable characteristics by setting the pointer to an initial position on the scale 8 calibrated for one of said characteristics whereupon the scale 4 with its color zones will indicate the quality or other variable characteristic. For example, an electric cable tester may have to test the electrostatic capacity or dielectric resistance of a cable and would have to take into consideration the different thicknesses of cables and the different grades of dielectric material upon which the capacity and resistance depend. If a moderate number of cable thicknesses have to be compensated for, one meter could be used for any of the sizes requiring one scale 4 with color zones indicating, say, dielectric resistance, and one scale 8 graduated for cable thicknesses.

I claim:

1. An electrical measuring instrument comprising a movable indicator responsive to variable electric characteristics and having an initial position of rest, a dial for giving readings in conjunction with said indicator, said dial having a first scale remote from the initial position of said indicator cooperating with said indicator when removed from its initial position and a second scale near the initial position of the indicator and cooperating therewith when the indicator is in its initial position, and manually operated means to adjust the initial position of the indicator to any point on said second scale.

2. An electrical measuring instrument for testing batteries of different sizes, comprising a movable indicator, a dial for giving readings in conjunction with said indicator, said dial having a first scale cooperating with said indicator for measuring battery voltage and a second scale near the initial position of the indicator and cooperating therewith, said second scale being graduated to indicate battery size or plate number, and manually operated means to adjust the initial position of the indicator to any point on said second scale.

3. An electrical measuring instrument for testing batteries, comprising a movable indicator, a dial for giving readings in conjunction with said indicator, said dial having a first scale cooperating with said indicator for measuring one variable of a battery and a second scale near the initial position of the indicator and cooperating therewith, said second scale being graduated to indicate another variable of the battery, manually operated means to adjust the initial position of the indicator to any point on said second scale, and means for suppressing indicator travel through a range from zero of the variable to be measured on the first scale up to the lower limit of a selected range of said variable whereby the whole effective travel of said indicator through the first scale is utilized for said selected range.

4. An electrical measuring instrument for testing batteries of different sizes, comprising a movable indicator, a dial for giving readings in conjunction with said indicator, said dial having a first scale cooperating with said indicator for measuring battery voltage and a second scale near the initial position of the indicator and cooperating with said indicator, said second scale being graduated to indicate battery size or plate number, manually operated means to adjust the initial position of the indicator to any point on said second scale, and means for suppressing indicator travel through a range from zero voltage to the lower limit of the voltage testing range whereby the whole effective travel of said indicator through the first scale is utilized for said testing range.

5. An electrical measuring instrument for testing batteries, comprising a movable indicator, a dial for giving readings in conjunction with said indicator, said dial having a first scale cooperating with the indicator for measuring one variable of a battery and a second scale near the initial position of the indicator and cooperating with said indicator, said second scale being graduated to indicate another variable of the battery, manually operated means to adjust the initial position of the indicator to any point on said second scale, and means for suppressing indicator travel through a range from zero of the variable to be measured on the first scale up to the lower limit of a selected range of said variable whereby the whole effective travel of said indicator through the first scale is utilized for said selected range, said suppressing means including a bridge circuit across which the instrument is connected, two arms of the bridge containing fixed resistances and the other two containing resistances which increase when the current flowing through them increases.

6. An instrument for testing units having a plurality of interdependent variable characteristics comprising a movable indicator having an initial position of rest, a dial cooperating therewith, said dial having a first scale remote from said initial position of the indicator and cooperating with said indicator, when said indicator is removed from its initial position, for measuring one of said variable characteristics and a second scale near the initial position of the indicator and cooperating with said indicator when said indicator is in said initial position, said second scale being graduated to indicate another variable characteristic, and manually operated means to adjust the initial position of the indicator to any point on said second scale to compensate the readings of the first variable characteristic for changes in the other variable characteristic.

7. An instrument for testing units having a plurality of interdependent variable characteristics comprising a movable indicator having an initial position of rest, a dial cooperating therewith, said dial having a first scale, remote from said initial position of the indicator and cooperating with said indicator, when said indicator is removed from said initial position, for measuring one of said variable characteristics and a second scale near the initial position of the indicator and cooperating therewith when said indicator is in said initial position, said second scale being graduated to indicate another variable characteristic, manually operated means to adjust the initial position of the indicator to any point on said second scale to compensate the readings of the first variable characteristic for changes in the other variable characteristic, and means for suppressing travel of the indicator over an undesired range of the variable characteristic to be measured on the first scale whereby the entire length of said scale is available for a range of the variable characteristic which it is desired to measure.

CLARENCE W. DALZELL.

REFERENCES CITED

The following references are of record in the file of this patent:

UNITED STATES PATENTS

| Number | Name | Date |
|---|---|---|
| 1,904,096 | St. Clair | Apr. 18, 1933 |
| 1,952,072 | Jewell | Mar. 27, 1934 |
| 1,193,096 | West | Aug. 1, 1916 |
| 1,709,851 | Huggins | Apr. 23, 1929 |
| 1,586,445 | Hinkley | May 25, 1926 |
| 1,435,259 | Roller | Nov. 14, 1922 |
| 1,753,043 | Butler | Apr. 1, 1930 |
| 2,225,051 | Heyer | Dec. 17, 1940 |
| 2,091,024 | Beshers | Aug. 24, 1937 |
| 2,267,826 | Heyer | Dec. 30, 1941 |
| 2,352,499 | Sears | June 27, 1944 |

FOREIGN PATENTS

| Number | Country | Date |
|---|---|---|
| 306,818 | Great Britain | July 8, 1930 |